UNITED STATES PATENT OFFICE.

JOHANN BONER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING ANTHRAQUINONE COMPOUNDS.

1,083,051. Specification of Letters Patent. Patented Dec. 30, 1913.

No Drawing. Application filed September 20, 1910. Serial No. 582,939.

*To all whom it may concern:*

Be it known that I, JOHANN BONER, Ph. D., chemist, a citizen of the Swiss Republic, residing at Ludwigshafen-on-the-Rhine, Germany, have invented new and useful Improvements in Producing Anthraquinone Compounds, of which the following is a specification.

In the *Berichte der Deutschen Chemischen Gesellschaft*, vol. 14 (1881), page 484, it is stated that if anthracene be treated in glacial acetic acid solution with nitrogen tetroxid, anthraquinone can be obtained. I have now discovered that anthraquinone can be obtained in a better manner, that is to say in a state of greater purity, by treating anthracene at a raised temperature in the presence of an organic liquid of the aromatic series, such for instance as nitrobenzene. The process can be carried out by allowing the reaction to commence at an elevated temperature, or the nitrogen tetroxid can be brought into contact with the dissolved or suspended anthracene at ordinary temperature and the mixture be heated till the reaction is completed. The nitrogen tetroxid is reduced to nitric oxid and this can subsequently be treated with air, or oxygen, to regenerate nitrogen tetroxid. Instead of anthracene, derivatives thereof can be oxidized in a similar manner, such for instance as anthracene-2-sulfonic acid and halogenated anthracene.

The following example will serve to illustrate further the nature of my invention, which, however, is not confined to this example. The parts are by weight. Mix together one hundred parts of nitrobenzene and thirty parts of nitrogen tetroxid, and introduce twenty-five parts of anthracene, while maintaining the temperature at about fifteen degrees centigrade. Allow the mass to stand for a few hours at ordinary temperature and then slowly heat the mixture to about one hundred degrees centigrade. When the evolution of nitric oxid has ceased, allow the mixture to cool and filter off and wash the anthraquinone which is thus obtained in excellent yield and in a satisfactory state of purity. In this example, instead of anthracene, a derivative thereof, such for instance as anthracene-2-monosulfonic acid, can be employed, and instead of nitrobenzene, other suitable solvent or suspension agent, for instance ortho-dichlor-benzene can be used.

Now what I claim is:—

1. The process for producing an anthraquinone compound by heating an anthracene compound with nitrogen tetroxid in the presence of an organic liquid of the aromatic series.

2. The process of producing anthraquinone by heating anthracene with nitrogen tetroxid in the presence of an organic liquid of the aromatic series.

3. The process of producing anthraquinone by heating anthracene with nitrogen tetroxid in the presence of nitrobenzene.

In testimony whereof I have hereunto set my hand in the presence of two subscribing witnesses.

JOHAN BONER.

Witnesses:
  J. ALEC. LLOYD,
  JOSEF PFEIFFER.